United States Patent

Nara

[11] Patent Number: 5,481,920
[45] Date of Patent: Jan. 9, 1996

[54] FLUID PRESSURE MEASURING SENSOR USING STRAIN GAUGES

[75] Inventor: Koichi Nara, Tsukuba, Japan

[73] Assignee: Agency of Industrial Science & Technology, Ministry of International Trade & Industry, Tokyo, Japan

[21] Appl. No.: 235,692

[22] Filed: Apr. 29, 1994

Related U.S. Application Data

[63] Continuation-in-part of Ser. No. 144,430, Nov. 2, 1993, abandoned.

[30] Foreign Application Priority Data

Nov. 17, 1992 [JP] Japan ..................................... 4-332335

[51] Int. Cl.$^6$ ........................................................ G01L 9/04
[52] U.S. Cl. ............................. 73/726; 73/720; 73/727
[58] Field of Search ........................... 338/4, 42; 73/720, 73/721, 726, 727, DIG. 3

[56] References Cited

U.S. PATENT DOCUMENTS 4,376,929  3/1983  Myhre ............................ 338/4
4,476,726  10/1984 Kurtz et al. ..................... 73/721 X
4,488,436  12/1984 Mohri et al. ..................... 338/4 X
5,289,721  3/1994  Tanizawa et al. ................ 338/4 X Primary Examiner—Richard Chilcot
Assistant Examiner—Joseph L. Felber
Attorney, Agent, or Firm—Oblon, Spivak, McClelland, Maier & Neustadt

[57] ABSTRACT

A pressure sensor for fluids includes first, second, third and fourth strain gauges disposed on a diaphragm with prescribed spacing so that the majority of current flowing through the first strain gauge has a predetermined direction and the majority of current flowing through each of the second, third and fourth strain gauges has a direction identical with or opposite to the predetermined direction, first and second conductors interconnecting the first and second strain gauges and the third and fourth strain gauges, and first and second voltage leads connected to the first and second conductors from the side identical with or opposite to the direction of a vector product determined by a vector in the direction of current flow through the conductors and a vector in a direction normal to the diaphragm. The configuration causes voltages produced in the conductors by the Hall effect to cancel out, thus making the pressure sensor immune to the effect of magnetic fields.

2 Claims, 5 Drawing Sheets

5,481,920

FLUID PRESSURE MEASURING SENSOR USING STRAIN GAUGES

CROSS-REFERENCE TO RELATED APPLICATION

This is a continuation-in-part of application Ser. No. 08/144,430, filed Nov. 2, 1993, now abandoned.

BACKGROUND OF THE INVENTION

1. Field of the Invention

This invention relates to a pressure sensor for measuring the pressure of fluids at cryogenic temperatures under magnetic fields.

2. Prior Art Statement

Recent years have seen increased use of magnetic fields in a wide range of disciplines. Behind this has been the advances made in superconducting magnet technology. While superconducting magnets are able to conduct current at zero electrical resistance, they have to be cooled to cryogenic temperatures in order to function. Liquid helium is used as the cooling medium.

In order to ensure reliable operation of a cooling system using such a cooling medium, it is indispensable to be able to measure the pressure of the cooling medium at cryogenic temperatures (down to a few degrees K). Since no pressure sensor reliable at cryogenic temperatures was available, however, the ordinary practice was to use a capillary for conducting the pressure from the cryogenic temperature region to a room temperature region and measuring it there with a room temperature pressure measurement system.

This conventional method of pressure measurement via a capillary exhibits poor response, however, because a time delay arises owing to the time required for the medium to travel from the cryogenic temperature region to the room temperature pressure measurement system. In addition, where the pressure within a closed volume that expands and contracts at cryogenic temperatures is measured, accurate measurement becomes impossible because the volume of the capillary is added to the compressed volume of the cooling system. Moreover, there is also a possibility that heat traveling along the capillary from the room temperature region to the cryogenic temperature region may place an excessive heat load on the refrigeration equipment of the cooling system.

All of these problems would be eliminated if it were possible to measure the pressure of the cooling medium with a pressure sensor located in the low temperature region. To enable such measurement, the pressure sensor would have to be able to operate under cryogenic temperatures, to be compact, to produce little heat during measurement, and, when used to measure the pressure of the cooling medium of a superconducting magnet, to be capable of conducting the measurement without influence from the magnetic field.

The present invention was accomplished to overcome the aforesaid problems and has as its object to provide a compact pressure sensor for fluids capable of operating accurately at cryogenic temperatures substantially unaffected by magnetic fields.

SUMMARY OF THE INVENTION

For achieving the aforesaid object, this invention provides a pressure sensor for fluids comprising a diaphragm, first, second, third and fourth strain gauges disposed on the diaphragm at prescribed spacing so that a majority of current flowing through the first strain gauge has a predetermined direction and a majority of current flowing through each of the second, third and fourth strain gauges has a direction identical with or opposite to the predetermined direction, a first conductor for interconnecting the first and second strain gauges, a second conductor for interconnecting the third and fourth strain gauges, means for supplying electric current to the four strain gauges, a first voltage lead connected to the first conductor, a second voltage lead connected to the second conductor, the first voltage lead and the second voltage lead being connected respectively to the first conductor and the second conductor from a side identical with or opposite to a direction of a vector product determined by a vector in a direction of current flow through the conductors and a vector in a direction normal to the diaphragm, and means for measuring voltage between the first voltage lead and the second voltage lead.

Since the first, second, third and fourth strain gauges are disposed on the diaphragm so that the majority of current flowing through each of the first, second, third and fourth strain gauges has a direction identical with or opposite to a predetermined direction and since the first and second voltage leads are connected respectively with the first and second conductors from the side identical with or opposite to the direction of a vector product determined by a vector in the direction of current flow through the conductors and a vector in the direction normal to the diaphragm, the voltages produced in the first and second conductors by the Hall effect cancel each other and, as the effect of magnetoresistance appears similarly on all strain gauges, it virtually induces no effect on the resistance of the output resistance of the sensor. As a result, the pressure sensor according to the invention is able to accurately measure voltage substantially unaffected by magnetic fields.

As the pressure sensor according to the invention can be constituted using semiconductor strain gauges, it can be fabricated to be small in size and so as to produce almost no heat during measurement, features which make it ideal for measuring the pressure of fluids at cryogenic temperatures.

The above and other features of the present invention will become apparent from the following description made with reference to the drawings.

DESCRIPTION OF THE PREFERRED EMBODIMENTS

Through a study conducted to determine whether or not commercially available room temperature pressure sensors are capable of measuring pressure at cryogenic temperatures under a magnetic field, the inventor discovered that the PD116S piezo-resistive pressure sensor manufactured by Toyoda Machine Works Ltd. of Japan is able to make measurements under such harsh conditions.

Figure 4:
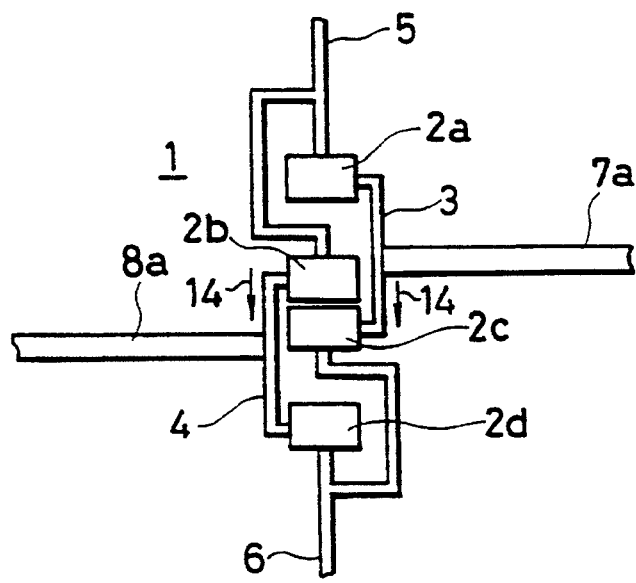
FIG. 4 is a diagram showing the wiring pattern of the strain gauges formed on a diaphragm and the wiring pattern of a prior art pressure sensor.

The general configuration of the PD116S pressure sensor is shown in FIG. 4. The pressure sensor has four strain gauges 2a, 2b, 2c, 2d arranged in a straight line at prescribed spacing on a silicon substrate serving as a diaphragm 1. The strain gauges 2a, 2c are electrically connected by a conductor 3 and the strain gauges 2b, 2d are electrically connected by a conductor 4. A voltage lead 7a is connected to and extends outwardly from the outer side of the conductor 3 and a voltage lead 8a is connected to and extends outwardly from the outer side of the conductor 4. In other words, with respect to the direction of the currents flowing through the conductor 3 and the conductor 4, as indicated by arrows 14, the voltage lead 7a is connected on the left side relative to the current flow and the voltage lead 8a is connected on the right side.

Current supplied to the pressure sensor of the foregoing configuration through current supply lines 5, 6, passes through the strain gauges. If the diaphragm should be deformed, the resulting expansion/contraction of the strain gauges produces changes in the resistance of the strain gauges in proportion to the degree of the expansion/contraction. A voltage is produced between the voltage leads 7a and 8a that is proportional to the magnitude of the external force (i.e., the pressure of the fluid) acting on the diaphragm. It is therefore possible to ascertain the pressure of the fluid by measuring this voltage.

This pressure sensor is designed to measure pressure at room temperature under conditions where no magnetic field is present. To check whether the measurement value changes at a cryogenic temperature under a magnetic field applied in the direction normal to the diaphragm, three of the pressure sensors were placed in a 9° K. environment under constant pressure and only the intensity of the magnetic field was varied while the magnetic field dependence of the resistance was being measured. The results are shown in FIG. 5, in which the vertical axis is scaled the percentage of change in the resistance relative to the resistance (20Ω) at the full scale pressure of the pressure sensor when not in a magnetic field.

Figure 5:
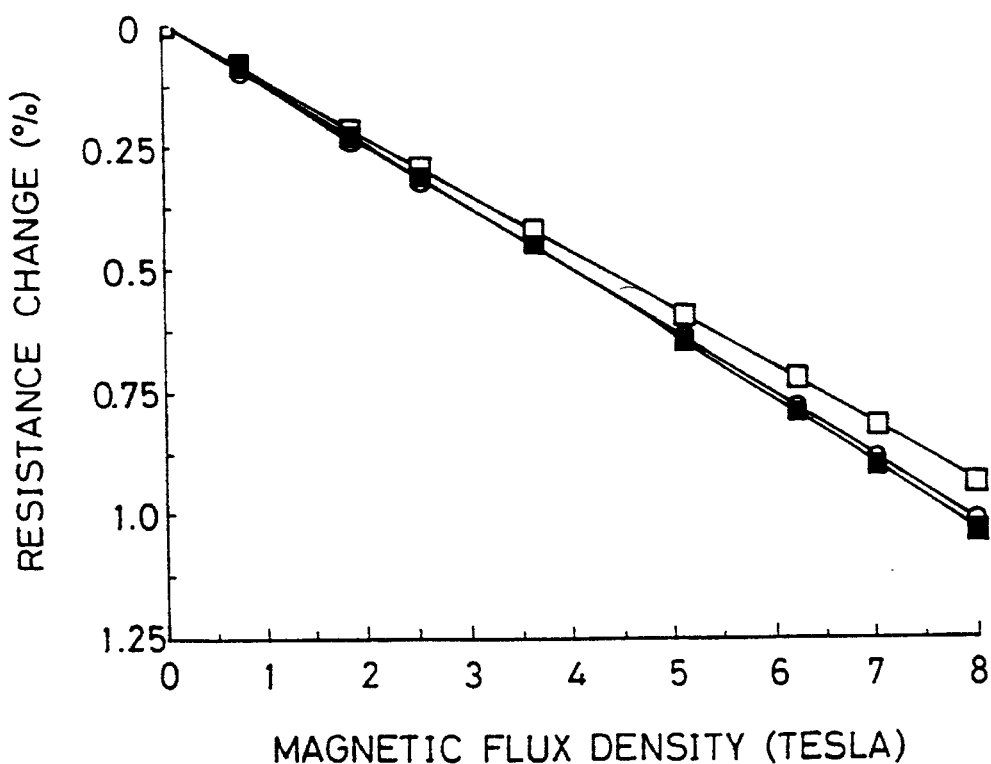
FIG. 5 is a graph showing the magnetic field dependence of the resistance of the pressure sensor of FIG. 4.

From FIG. 5 it is clear that the resistances of all of the three pressure sensors changed by about 1% under a magnetic field with a flux density of 8 Tesla.

Figure 6:
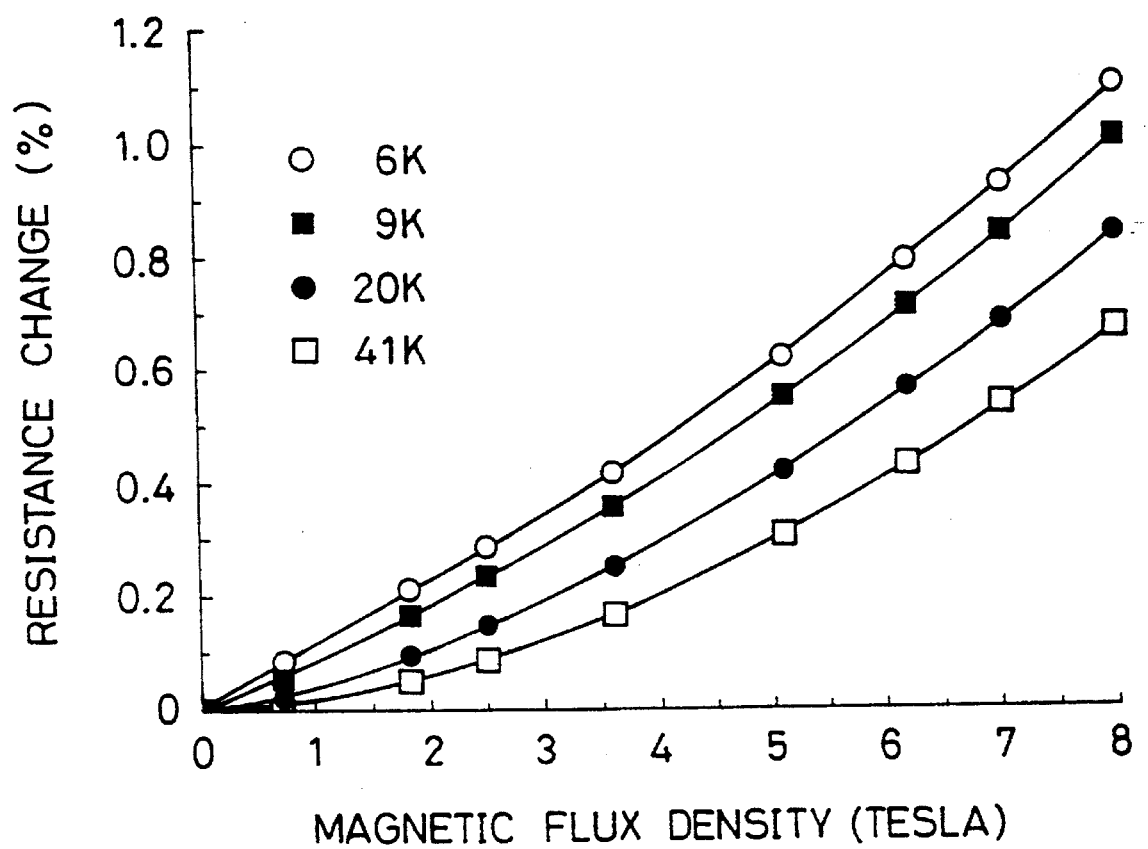
FIG. 6 is a graph showing the magnetic field dependence of the average resistance of the strain gauges in the pressure sensor of FIG. 4.

The magnetic field dependence of the resistance of the individual strain gauges in the prior art pressure sensor was measured. The results are as shown in FIG. 6 in which the longitudinal axis stands for the resistance change and the lateral axis for the magnetic flux density. It is clear from FIG. 6 that the average resistance of the strain gauges increased by not less than 1% under a magnetic field with a flux density of 1 to 8 Tesla and that the larger the flux density or the lower the temperature, the larger the change of the resistance.

It is presumed from the general magnetoresistance characteristic that the resistance change of a strain gauge relative to the flux density of a magnetic field is represented by a function of $\sin^2 \theta$ when the $\theta$ stands for the angle between the direction in which the magnetic field is applied and the direction in which the electric current flows through the strain gauge and that the resistance change becomes maximum when the angle is 90° and minimum when the angle is 0°, 180° or 360°.

The inventor considered the cause of the aforementioned resistance change from the aspects of the electric resistance increase resulting from a magnetic field and the Hall effect. As a result, it was found that notwithstanding the magnetoresistance of a strain gauge increased conspicuously at low temperatures, the resistance of a pressure sensor having the strain gauge exhibited low temperature dependency and consequently it was concluded that when the directions in which the majority of current flows through four strain gauges are the same all the strain gauges have substantially the same magnetoresistance and that the influence of the magnetic field owing to the magnetoresistance upon the strain gauges became very small.

Further studies by the inventor on the effect of a magnetic field on a pressure sensor revealed that the change in resistance of the pressure sensor was caused by voltages produced in the conductors by the Hall effect resulting from the application of the magnetic field perpendicular to the direction of current flow. The magnitude of the voltages is independent of the width of the conductors and is determined by the material and thickness of the conductors and the strength of the magnetic field.

This invention was accomplished on the basis of this knowledge. It will now be explained in detail with reference to the drawings.

Figure 1:
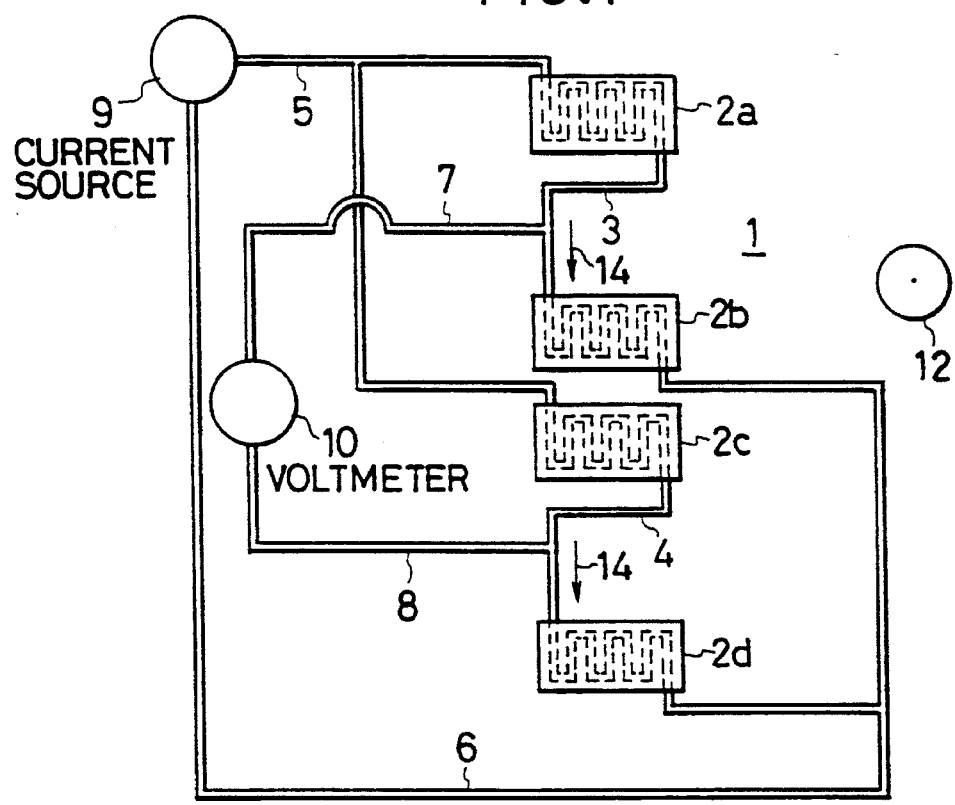
FIG. 1 is a diagram showing the strain gauges formed on a diaphragm and the wiring pattern of the pressure sensor according to the invention.

In FIG. 1, reference numeral 1 denotes a diaphragm. Four strain gauges 2a, 2b, 2c, 2d are disposed on the diaphragm 1 along a straight line at prescribed spacing. The strain gauge 2a and the strain gauge 2b are interconnected by a conductor 3 and the strain gauge 2c and the strain gauge 2d are interconnected by a conductor 4.

Figure 7:
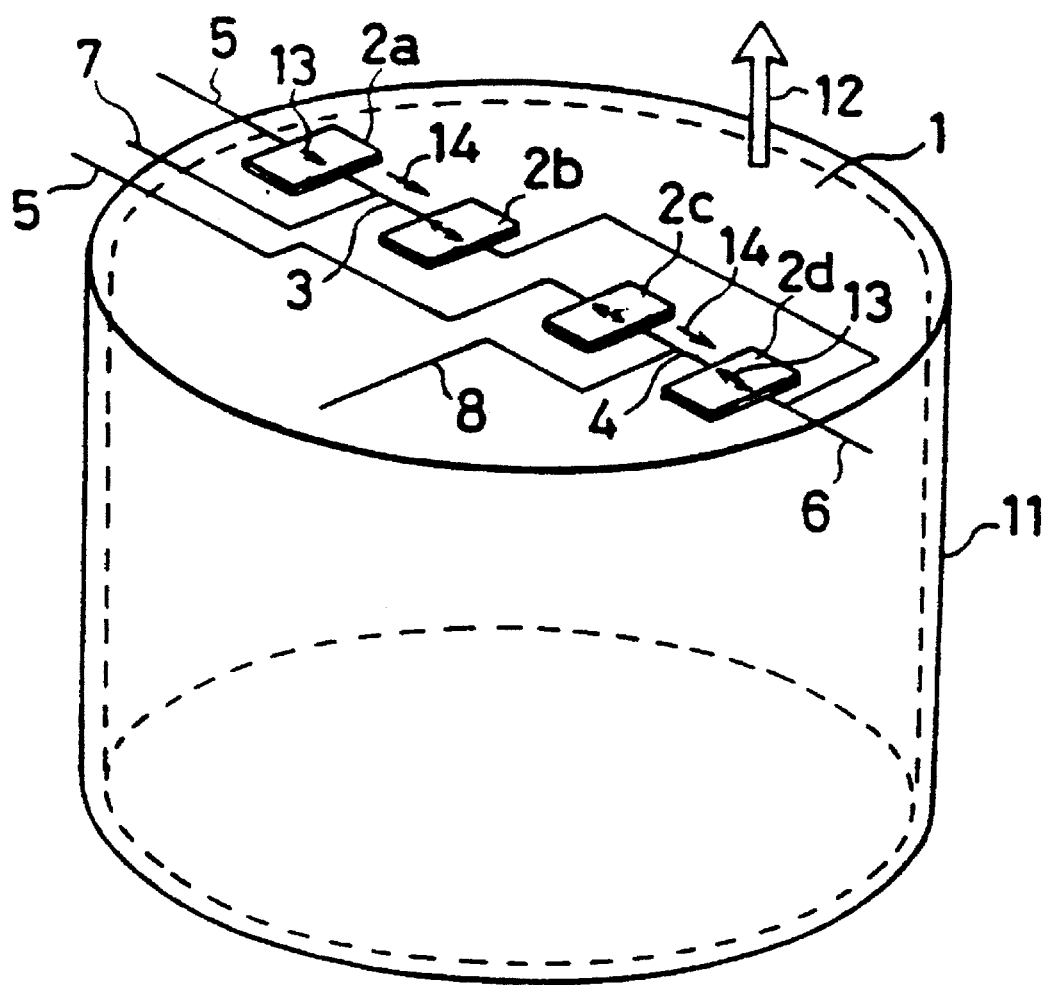
FIG. 7 is a schematic view showing the principal part of a second embodiment of the pressure sensor according to the invention.

When gauges having a comb current passage are used, they are disposed on the diaphragm 1 so that the teeth of the comb are oriented in the same direction as shown by dotted lines in FIG. 1. When using gauges having a straight current passage, they are disposed on the diaphragm 1 so that the directions in which the electric current flows therethrough are the same as shown by arrows 13 in FIG. 2. FIG. 7 shows that the current flows 13 in gauges 2b, 2c, 2d, can be in the same direction or opposite the current flow 13 in gauge 2a.

By disposing the strain gauges on the diaphragm 1 as described above, specifically so that the majority of current flowing through the first strain gauge 2a has a predetermined direction and that the majority of current flowing through each of the second, third and fourth strain gauges 2b, 2c and 2d has a direction identical with or opposite to the predetermined direction, the strain gauges, when affected by magnetoresistance, exhibit substantially the same degree of affection and, therefore, the strain gauges are hardly influenced by the magnetic field.

Figure 2:
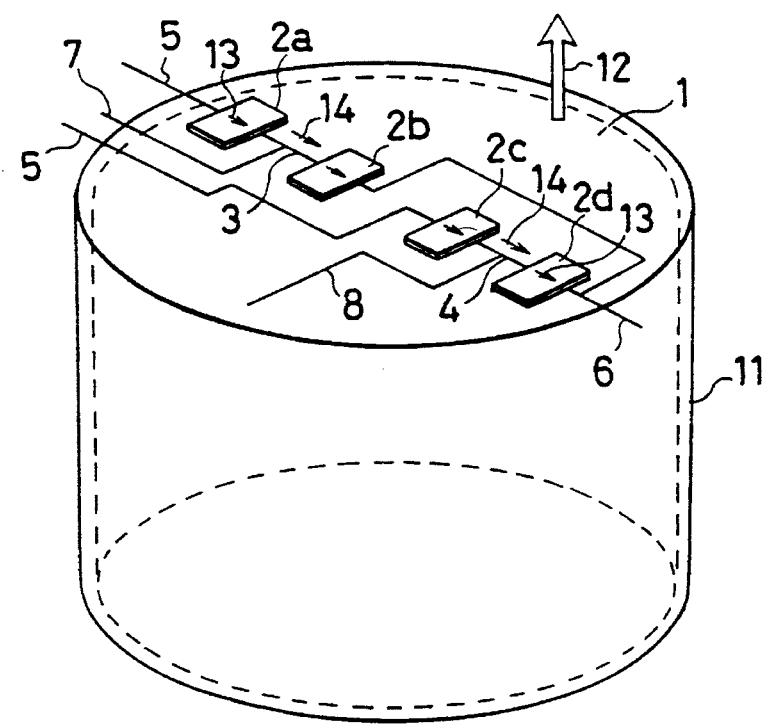
FIG. 2 is a perspective view of an embodiment of the pressure sensor according to the invention.

A voltage lead 7 for leading out the voltage between the strain gauges 2a and 2b and a voltage lead 8 for leading out the voltage between the strain gauges 2c and 2d are connected respectively to the conductors 3 and 4 from the side identical with or opposite to the direction of a vector product determined by a vector in the direction of current flow through the conductors 3 and 4 (as shown by arrows 14 in FIG. 1 or FIG. 2) and a vector in the direction normal to the diaphragm 1 (as shown by arrow 12 in FIG. 2). In the illustrated embodiment, the voltage leads 7 and 8 are connected at right angles respectively to the right sides of the conductors 3 and 4 with respect to the direction of current flow. However, they may of course be connected at right angles to the left sides of the conductors 3 and 4, respectively. The other ends of the voltage leads 7, 8 are connected to a voltmeter 10. The strain gauges are supplied with current from a current source 9 via current supply lines 5, 6.

As shown in FIG. 2, the diaphragm 1 provided with the strain gauges and wiring in the foregoing manner is supported on a hollow stage 11. The inside of the stage is communicated with the gaseous helium in a helium refrigerator or with some other fluid whose pressure is to be measured so as to lie perpendicular to the magnetic field, as shown by arrow 12.

Current is supplied to the strain gauges from the current source 9. In this state, when a change in the pressure of the fluid deforms the diaphragm 1 and causes the strain gauges to expand or contract, the resistance of the strain gauges changes in accordance with the degree of the expansion/contraction, causing a corresponding change in the voltage between the voltage leads 7, 8 measured by the voltmeter 10. It is therefore possible to determine the change in fluid pressure from the reading of the voltmeter 10.

Since in this invention the two voltage leads 7, 8 are connected with the conductors 3, 4 from the side identical with or opposite to the direction of a vector product determined by a vector in the direction of current flow through the conductors 3 and 4 and a vector in the direction normal to the diaphragm 1, voltages produced in the conductors 3, 4 by the Hall effect under the magnetic field are in the same direction. However, the pressure sensor according to this invention is not affected by these voltages. This is because the magnitude of the voltage depends solely on the strength of the magnetic field and the thickness and carrier density of the connector portions of the conductors 3, 4. Since in the ordinary fabrication process the connector portions are simultaneously injected with the same amount of carriers, the Hall voltages produced in the connector portions are equal. Moreover, since the direction of the voltage produced by the Hall effect is determined by a vector product of the vector in the direction of current flow and the vector in the direction of application of an electric field, the directions of the Hall voltages generated by an electric current and a magnetic field in the two voltage leads 7 and 8 are the same. Therefore, the Hall voltages do not affect the relative output appearing between the two voltage leads 7 and 8. In addition, since the two connector portions are close to each other, the effect of spacial variations in the magnetic field are negligible. Since the Hall effects appearing in the two voltage leads are therefore the same in direction and magnitude, they completely cancel each other. This makes it possible to measure the pressure of a fluid at cryogenic temperatures under a strong magnetic field substantially unaffected by the magnetic field.

Since the pressure sensor according to this embodiment is fabricated by doping and etching a diaphragm made of silicon or the like, the voltage leads for leading out the voltages can easily be connected with the prescribed side of the conductors 3, 4 even if the conductors are fabricated to be no more than several μm in width.

Figure 3:
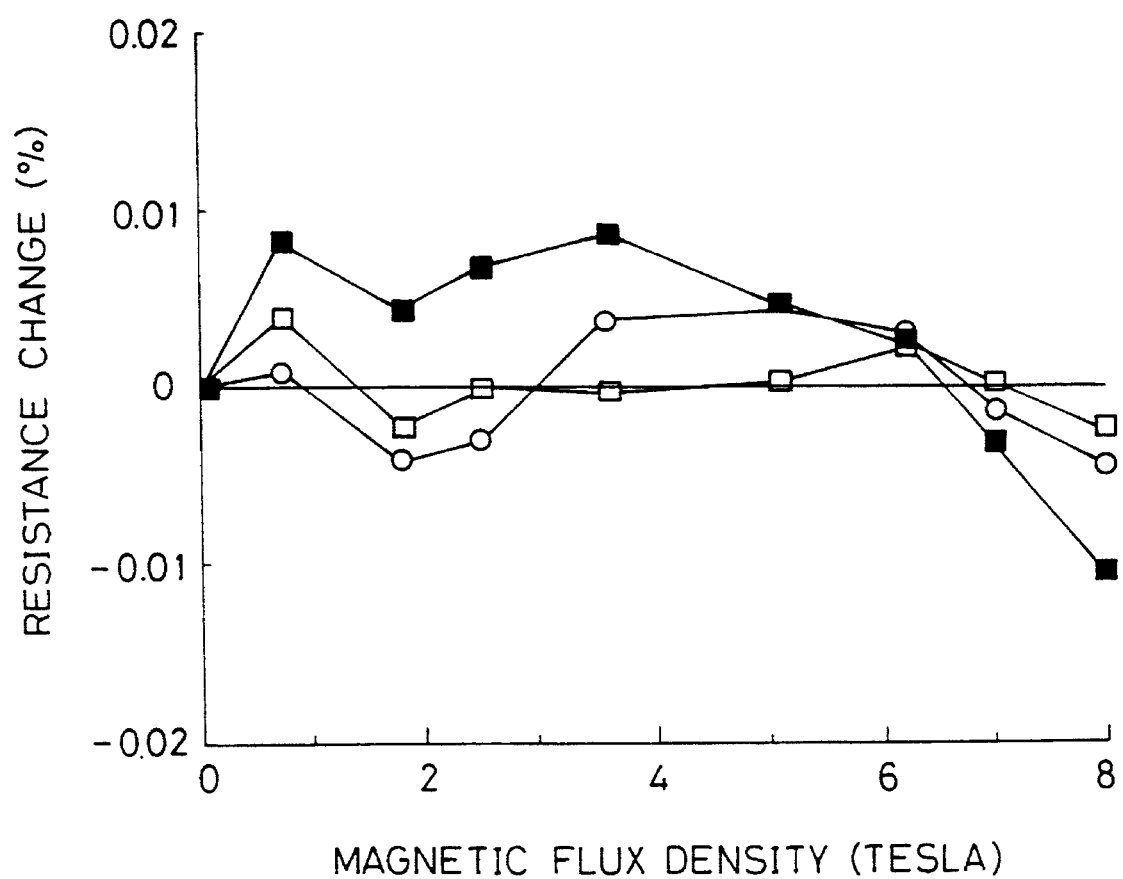
FIG. 3 is a graph showing the magnetic field dependence of the resistance of the pressure sensor according to the invention.

The graph of FIG. 3 shows the magnetic field dependence of the resistance of the pressure sensor according to the invention.

Each of three pressure sensors was fabricated by doping an approximately 3.5 mm diameter silicon substrate with boron and then etching it in the pattern shown in FIG. 2 to form the strain gauges and wiring. A pressure sensor was obtained by bonding the silicon substrate to one open end of a Pyrex® cylinder measuring about 3.5 mm in diameter and about 4 mm in height. The three pressure sensors were placed in a constant pressure 9° K. environment and their resistances were measured under a magnetic field varied in strength between 0 and 8 Tesla.

All three pressure sensor had a resistance at full scale pressure of 20Ω. In the graph of FIG. 3, the vertical axis represents the percentage of change with respect to this value of 20Ω.

As can be seen, in two of the pressure sensors the resistance change with change in magnetic field strength remained within ±0.01% and was substantially unaffected even at high flux density.

In this measurement, since there is little influence of the magnetic field on the resistance change in the strain gauges and since the directions of current flow through the gauges are the same, even under the change in direction of the electric field applied to the pressure sensor, the influence of the magnetoresistance is exerted uniformly upon all the strain gauges and, therefore, it is possible to disregard the influence of the magnetic field resulting from the magnetoresistance. Assuming that the strain gauges are disposed so that the directions of current flow through the strain gauges are vertical to each other, the magnetoresistance in each of the strain gauges relies on the direction of the magnetic field and is made different between the strain gauges and, therefore, it can be expected to induce zero shift relying on the environmental temperature and the direction of the magnetic field.

During monitoring for abnormalities in the cooling system of a superconducting magnet, abnormal pressure and magnetic field fluctuation can be expected to occur at the same time. The direction of the magnetic field at that time is optional with respect to the pressure sensor and the intensity thereof fluctuates upon elapse of time. Therefore, the issuance of erroneous signals or the like as a result of magnetic field fluctuation has a deleterious effect on both safety and operation energy utilization efficiency. Particularly in pressure measurement at low temperatures, the sensor operating pressure is normally maintained very small relative to full scale in order to ensure safety. A fluctuation of 1% relative to full scale as in the case of the pressure sensor of FIG. 4 is intolerably large. Since the pressure sensor according to this invention achieves a reduction in the fluctuation rate to one-hundredth of 1%, it substantially eliminates the problem caused by the presence of a magnetic field.

Under a cryogenic temperatures environment, even a small amount of heat can produce a sharp increase in temperature. Conditions are particularly unstable because a change in pressure also results in a rapid increase in temperature. Because of this, with the prior art pressure sensor it has been impossible to determine accurately whether a detected signal is caused by a change in pressure or by the magnetic field. In contrast, the pressure sensor according to the invention is unaffected by magnetic fields and is therefore able to measure pressure with high accuracy. As such, it contributes to safety and energy utilization efficiency.

The pressure sensor according to this invention can also be applied in the refrigerators that have increasingly come into use for cooling superconducting magnets in recent years. Specifically, since it can be applied for pressure monitoring conducted for optimizing the efficiency of such refrigerators, it can be expected to contribute to their operational reliability in magnetic fields.

What is claimed is:

1. A fluid pressure measuring sensor comprising:
   a diaphragm;

first, second, third and fourth strain gauges disposed on said diaphragm with prescribed spacing so that a majority of current flowing through said first strain gauge has a predetermined direction and a majority of current flowing through each of said second, third and fourth strain gauges has a direction identical with or opposite to said predetermined direction;

a first conductor interconnecting said first and second strain gauges;

a second conductor interconnecting said third and fourth strain gauges;

an electric current supply connected to the four strain gauges;

a first voltage lead and a second voltage lead connected, respectively, to said first conductor and said second conductor from a side identical with or opposite to a direction of a vector product determined by a vector in a direction of current flow through said conductors and a vector in a direction normal to said diaphragm; and a voltmeter measuring voltage between said first voltage lead and said second voltage lead.

2. A pressure sensor for fluids according to claim 1, wherein the direction of the majority of current flowing through said second, third and fourth strain gauges is identical with said predetermined direction.

* * * * *